United States Patent
Vasseur et al.

(10) Patent No.: US 7,512,064 B2
(45) Date of Patent: Mar. 31, 2009

(54) AVOIDING MICRO-LOOP UPON FAILURE OF FAST REROUTE PROTECTED LINKS

(75) Inventors: Jean-Philippe Vasseur, Dunstable, MA (US); Stefano Previdi, Rome (IT); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 819 days.

(21) Appl. No.: 10/868,721

(22) Filed: Jun. 15, 2004

(65) Prior Publication Data

US 2005/0276216 A1 Dec. 15, 2005

(51) Int. Cl.
*G01R 31/08* (2006.01)
*H04L 12/28* (2006.01)

(52) U.S. Cl. ............................ 370/227; 370/255
(58) Field of Classification Search ......... 370/216–228, 370/241–258; 709/239
See application file for complete search history.

(56) References Cited

U.S. PATENT DOCUMENTS

| | | | |
|---|---|---|---|
| 5,964,841 A | 10/1999 | Rekhter | |
| 6,047,330 A | 4/2000 | Stracke, Jr. | |
| 6,628,649 B1 | 9/2003 | Raj et al. | |
| 6,657,951 B1 | 12/2003 | Carroll et al. | |
| 2002/0067720 A1* | 6/2002 | Garcia-Luna-Aceves et al. | 370/389 |
| 2002/0112072 A1* | 8/2002 | Jain | 709/239 |
| 2002/0131362 A1* | 9/2002 | Callon | 370/216 |
| 2002/0167898 A1* | 11/2002 | Thang et al. | 370/216 |
| 2003/0126287 A1 | 7/2003 | Charny et al. | |
| 2003/0233595 A1 | 12/2003 | Charny et al. | |
| 2004/0090913 A1 | 5/2004 | Scudder et al. | |
| 2004/0114569 A1* | 6/2004 | Naden et al. | 370/351 |
| 2005/0078610 A1 | 4/2005 | Previdi et al. | |
| 2005/0078656 A1* | 4/2005 | Bryant et al. | 370/351 |
| 2005/0152333 A1* | 7/2005 | Smith | 370/351 |

FOREIGN PATENT DOCUMENTS

WO WO-02/06918 A2 1/2002

OTHER PUBLICATIONS

European Search Report, European Application No. 05756141.7-1249, PCT/US2005018690, Feb. 11, 2008, 3 pages.

(Continued)

*Primary Examiner*—Seema S Rao
*Assistant Examiner*—Christine Duong
(74) *Attorney, Agent, or Firm*—Cesari and McKenna LLP (57) ABSTRACT

A technique incorporates an efficient means for avoiding micro-loops on a backup path associated with a failed protected link. An intermediate node delays updating a forwarding database (FDB) contained in the intermediate node based on the intermediate node's distance from the failed link. Specifically, intermediate nodes near the failed protected link delay updating their FDBs for a longer period of time than nodes farther away from the failed link. By updating FDBs in this manner, micro-loops may be avoided on the failed link's backup path as nodes on the backup path that are close to the failed link do not update their FDBs ahead of nodes farther away on the backup path.

31 Claims, 8 Drawing Sheets

OTHER PUBLICATIONS

"Notification of Transmittal of the International Search Report and the Written Opinion of the International Searching Authority, or the Declaration" of International Application No. PCT/US05/18690 with an International Filing Date of May 26, 2005.

P.Pan, et al., "Fast Reroute Extensions to RSVP-TE for LSP Tunnels," draft-ietf-mpls-rsvp-fastreroute-04.txt, Internet Engineering Task Force (IETF), http://www.ietf.org, pp. 1-36.

H. Smit, et al., "IS-IS extensions for Traffic Engineering," draft-ietf-isis-traffic-05.txt, Internet Engineering Task Force (IETF), http://www.ietf.org, pp. 1-12.

D. Haskin, et al., "A Method for Setting an Alternative Label Switched Paths to Handle Fast Reroute," draft-haskin-mpls-fast-reroute-05.txt, Internet Engineering Task Force (IETF), http://www.ietf.org, Nov. 2000, pp. 1-9.

D. Katz, et al. "Traffic Engineering Extensions to OSPF," draft-katz-yeung-ospf-traffic-05.txt, Internet Engineering Task Force (IETF), http://www.ietf.org, pp. 1-10.

J. Vasseur, et al., "Definition of an IS-IS Link Attribute sub-TLV," draft-vasseur-isis-link-attr-00.txt., Internet Engineering Task Force (IETF), http://ietf.org, Feb. 2004, pp. 1-5.

R. Callon, "Use of OSI IS-IS for Routing in TCP/IP and Dual Environments," Request For Comments (RFC) 1195, Internet Engineering Task Force (IETF), http://www.ietf.org, Dec. 1990, pp. 1-85.

D. Katz, et. al. "Traffic Engineering (TE) Extensions to OSPF Version 2," RFC 3630, Internet Engineering Task Force (IETF), http://www.ietf.org, Sep. 2003, pp. 1-14.

* cited by examiner

AVOIDING MICRO-LOOP UPON FAILURE OF FAST REROUTE PROTECTED LINKS

BACKGROUND OF THE INVENTION

1. Field of the Invention

The present invention relates to data networking and specifically to avoiding micro-loops in a data network employing protected links.

2. Background Information

A computer network is a geographically distributed collection of nodes interconnected by communication links and segments for transporting data between end stations, such as computers. Many types of network segments are available, with the types ranging from local area networks (LANs) to wide area networks (WANs). LANs typically connect personal computers and workstations over dedicated, private communications links located in the same general physical location, such as a building or a campus. LANs may also connect routers co-located within a close range.

WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Certain nodes, such as routers, are often configured to "route" data, such as packets, between various nodes in the network. Routing is typically performed at the network layer or layer-3 (L3) of the Open Systems Interconnect (OSI) Reference Model. Routers often maintain forwarding databases (FDBs), which are typically configured to hold routing information including L3 addresses and interface information that the router uses to determine where data (e.g., data packets) are to be forwarded in order to reach their destination. For example, a router may have a routing database containing one or more entries wherein each entry contains a L3 destination address of a destination node and interface information about an interface on the router through which the destination node may be reached. A data packet containing a destination address that matches a destination address of an entry in the routing table is forwarded by the router to the interface specified by the matching entry for transfer to the destination node.

A router may execute one or more routing protocols that enable the router to route packets and exchange routing information with other routers in the network. The routers often use this information to configure (e.g., compute) their FDBs. The routing protocols may include distance vector protocols, such as the Routing Information Protocol (RIP) or link-state protocols, such as the Intermediate-System-to-Intermediate-System (IS-IS) protocol or the Open Shortest Path First (OSPF) protocol. Routing information is typically exchanged between the routers in the form of advertisement messages. For example, nodes executing the IS-IS protocol exchange information using an advertisement message called a Link State Packet (LSP). Likewise, nodes executing the OSPF protocol exchange routing information using an advertisement message called a Link State Advertisement (LSA). As used herein, an advertisement message refers generically to a message that a routing protocol uses to convey routing information to other intermediate nodes (e.g., a router, a switch) in the network. An intermediate node that acquires an advertisement message may use information contained therein to update its FDB.

Routers may transfer data packets through the network between a source and destination in a "connection-oriented" manner using a connection-oriented protocol. A connection-oriented protocol transfers data packets through the network over a predefined path, often called a connection or circuit, that is established between the source and destination. Here, the connection or circuit is established between the source and destination before any data are transferred. After the connection has been established, data are transferred between the source and destination over a path defined by the connection. When the connection is no longer needed, the connection is typically "torn down" and resources, such as nodes, interfaces, protocols and so on, utilized by the connection are made available for other connections. An example of a connection-oriented protocol is the Multiprotocol Label Switching (MPLS) protocol. A resource, as used herein, refers to entities associated with an intermediate node. These entities may include the intermediate node itself, an interface (e.g., a port) on the intermediate node and a protocol running on the intermediate node.

Some connection-oriented protocols utilize unidirectional connections, i.e., connections that transfer data in one direction from a source to a destination. For example, a unidirectional connection between a router A and a router B transfers data in one direction from router A to router B. In order to transfer data in the other direction, i.e., from router B to router A, another unidirectional connection from router B to router A would have to be established. The connections may be "signaled" end-to-end using a signaling protocol, such as the Resource Reservation Protocol (RSVP). The end of the connection that initiates the signaling for the connection is often called the "head-end" of the connection and the end of the connection that terminates the signaling is often called the "tail-end" of the connection. The router hosting the head-end of the connection is often called the head-end node and the router hosting the tail-end of the connection is often called the tail-end node. Thus, for example, in a connection from a source to a destination where router A hosts the "head-end" of the connection and router B hosts the tail-end of the connection, router A is the head-end node and router B is the tail-end node.

To accommodate high availability, some connection-oriented protocols may include techniques that enable primary paths carrying connections to be quickly rerouted in the event that the primary path contains a failed link. For example, P. Pan, et al., "Fast Reroute Extensions to RSVP-TE for LSP Tunnels," draft-ietf-mpls-rsvp-fastreroute-04.txt, available from the Internet Engineering Task Force (IETF), describes a MPLS "fast reroute" (FRR) technique that may be used to quickly reroute around failed network elements (e.g., link, node) in a MPLS label-switched path. According to the technique, one or more links in the primary path are protected links (i.e., they are protected by an alternate path). If a failure occurs on a protected link or node, traffic carried on Traffic Engineering MPLS Label Switch Paths (TE LSPs) is locally rerouted onto e.g., an appropriate alternate path by the node immediately upstream from the failure. The alternate path acts as a FRR for the primary label-switched path and obviates having to resort to other perhaps costlier measures, such as tearing down the primary label-switched path and establishing a new primary label-switched path around the failed network element. Note that, a local reroute may be followed by an end-to-end re-optimization triggered by a head-end label-switched router (LSR) in order to cause the traffic to follow a more optimal label-switched path.

Figure 1:
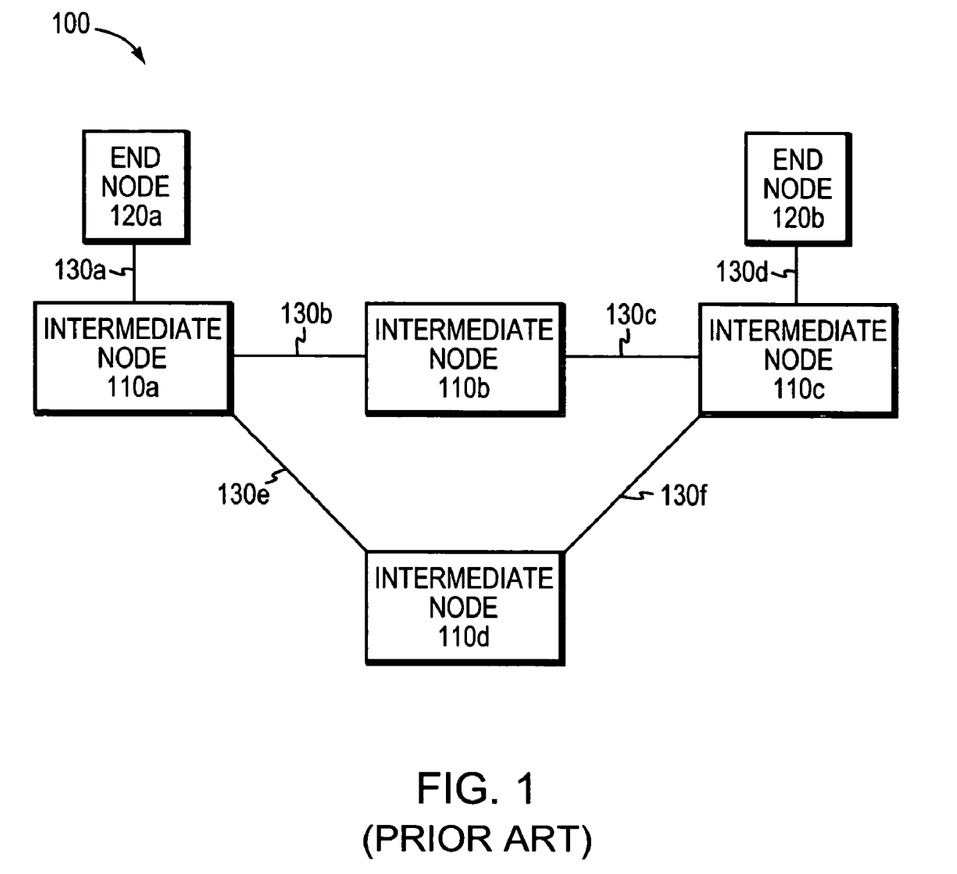
FIG. 1 is a high-level schematic block diagram of a data network employing a protected fast reroute link.

One problem with FRR techniques is that their advantages (e.g., the ability to quickly reroute around a failure) may be diminished due to e.g., micro-loops that may develop as a consequence of intermediate nodes responding to a failed link. For example, in an IP network, micro-loops typically occur due to differences in the time it takes for the intermediate nodes to recalculate their FDBs in response to the failed protected link. FIG. 1 illustrates an IP data network 100 comprising end nodes 120a-b coupled through data network 100 via various intermediate nodes 110a-d and data links 130a-f. Assume link 130c is a protected link that is associated with a alternate path to node 110c via nodes 110b, 110a and 110d. Further assume that a primary path extends from end node 120a to end node 120b via nodes 110a, 110b and 110c. Now assume link 130c fails and intermediate node 110b has detected the link failure and recalculated its FDB to direct traffic destined for end node 120b to the alternate path. Further assume intermediate node 110a has not recalculated its FDB to account for the failed link 130c and, thus, continues to forward data destined for end node 120b on the primary path. Data destined for end node 120b is forwarded by intermediate node 110a to intermediate node 110b which, in turn, forwards the data onto the alternate path to intermediate node 110a. Since it has not updated its FDB to account for the failed link 130c, intermediate node 110a forwards the data back to intermediate node 110b. Hence, a micro-loop between nodes 110a and 110b is formed. This micro-loop persists until intermediate node 110a updates its FDB to account for the failed link 130c.

In a typical network arrangement, the amount of time involved to switch from a primary path to an alternate path in a FRR scheme may be on the order of tens of milliseconds. On the other hand, the time it takes for intermediate nodes in a network to converge their FDBs to a network topology may take on the order of many hundreds of milliseconds. The convergence process may be further delayed due to micro-loops that may form at various points in the network while the intermediate nodes converge their FDBs to the network topology. During the time the intermediate nodes are converging their FDBs the network may be unavailable. This acts to diminish the value of fast rerouting (i.e., the ability to switch from a primary path to an alternate path quickly). Even though switching from a primary path to an alternate path in a FRR implementation may have occurred quickly (e.g., in tens of milliseconds), the alternative path may be unusable for perhaps hundreds of milliseconds due to e.g., network outages caused by FDB convergence further aggravated by the occurrence of micro-loops.

SUMMARY OF THE INVENTION

The inventive technique overcomes the disadvantages of the prior art by incorporating an efficient means for avoiding micro-loops in a computer network employing protected links. According to the technique, an intermediate node delays updating its forwarding database (FDB) based on the distance between the intermediate node and the failed link. Specifically, in accordance with the inventive technique, an intermediate node that is close to (i.e., a relatively short distance from) the failed protected link delays updating its FDB for a longer period of time than an intermediate node that is located farther away (i.e., a relatively long distance) from the failed link. By updating the FDBs in this manner, micro-loops may be avoided thereby speeding FDB convergence and intermediate nodes in the network.

In the illustrated embodiment, an intermediate node advertises protected links to its neighboring nodes using advertisement messages. When the intermediate node detects that a protected link has failed, it generates a new FDB and an advertisement message that takes into account the failed link. The intermediate node then floods the advertisement message to its neighboring nodes. Further, the intermediate node delays updating its FDB for an amount of time relative to the intermediate node's distance from the failed link. After the amount of time has elapsed, the intermediate node updates its FDB and begins using the updated FDB to forward data on e.g., a backup path associated with the failed protected link.

Advantageously, by delaying the update of a FDB for an amount of time relative to the distance between an intermediate node and a failed protected link, the inventive technique avoids the formation of micro-loops that might otherwise occur in the network.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 2:
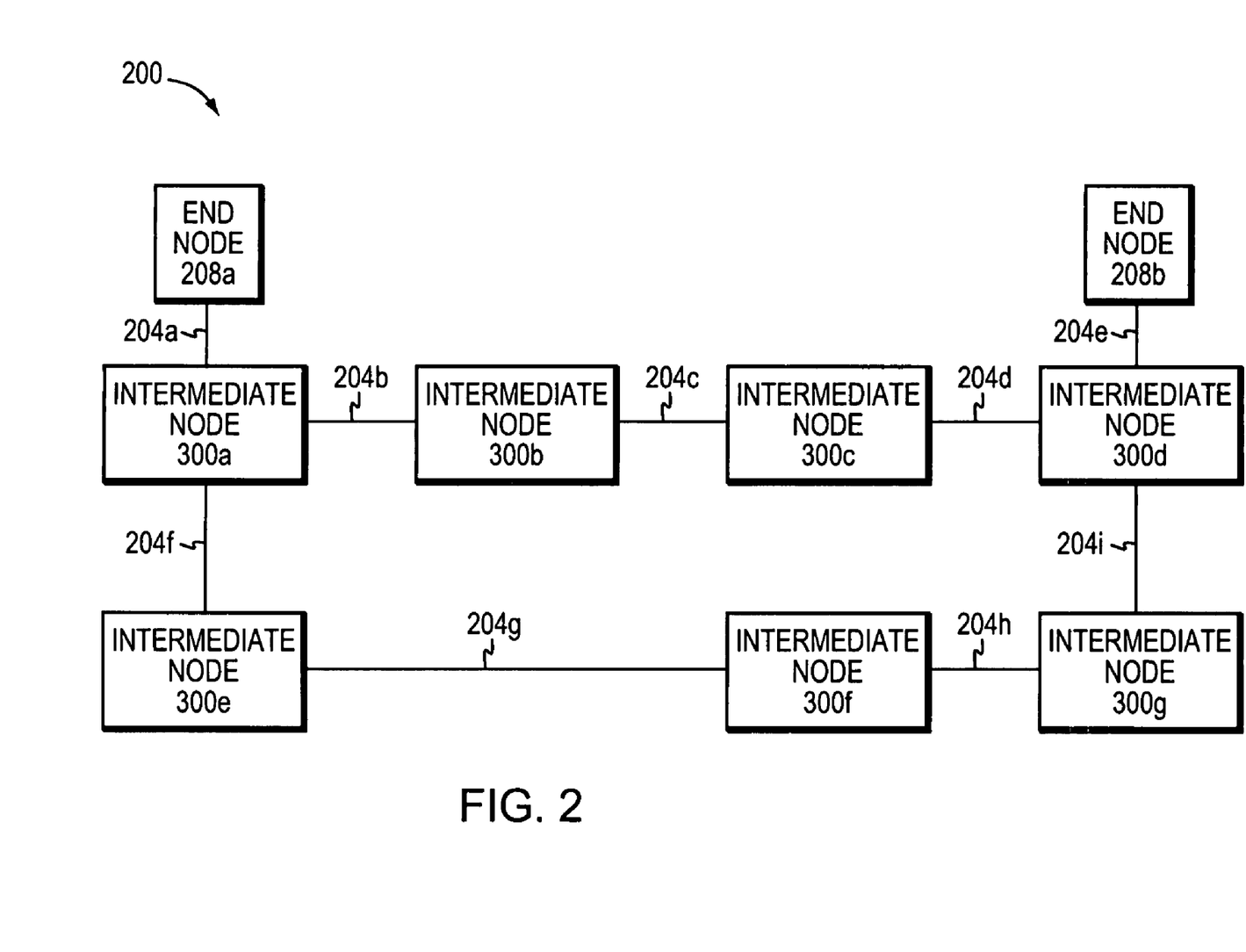
FIG. 2 is a high-level schematic block diagram of a data network that may be advantageously used with the present invention.

FIG. 2 is a schematic block diagram of a data network 200 that may be advantageously used with the present invention. The data network 200 comprises a collection of communication (data) links 204 connected to a plurality of network entities, such as end nodes 208 and intermediate nodes 300, to form an internetwork of computer nodes. These internetworked nodes communicate by exchanging data packets according to a predefined set of protocols, such as the Transmission Control Protocol/Internet Protocol (TCP/IP). A protocol, as used herein, is a set of formal rules describing how to transfer data between two entities in a data network.

Figure 3:
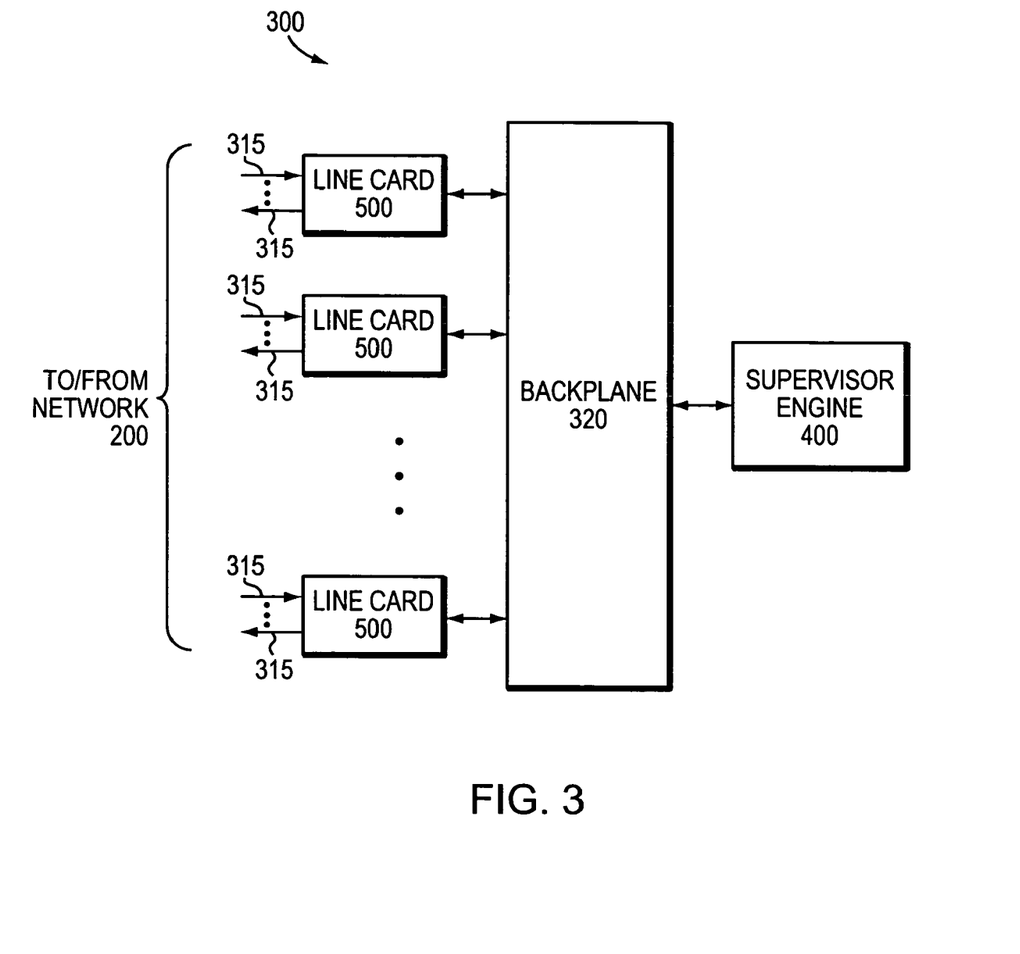
FIG. 3 is a high-level schematic block diagram of an intermediate node that may be advantageously used with the present invention.

FIG. 3 is a high-level partial schematic block diagram of intermediate node 300, which is illustratively a router. Suitable intermediate nodes that may be used with the present invention include the Cisco 7200, 7600 and 12000 Series routers available from Cisco Systems Incorporated, San Jose, Calif. Intermediate node 300 comprises one or more line cards 500 and a supervisor engine card 400 interconnected by a backplane 320. Node 300 is configured to perform, inter alia, various conventional layer-2 (L2) and layer-3 (L3) switching and routing functions including forwarding and processing data packets in accordance with the inventive technique. As used herein, L2 and L3 refer to the data link layer and network layer, respectively, of the Open Systems Interconnection (OSI) reference model. Node 300 is also configured to provide support for various combinations of protocols which may include Open Shortest Path First (OSPF), Intermediate-System-to-Intermediate-System (IS-IS), Multiprotocol Label Switching (MPLS), TCP/IP, IP fast reroute (FRR), MPLS FRR, Ethernet, Asynchronous Transfer Mode (ATM), and Frame Relay (FR).

The backplane 320 comprises a point-to-point interconnect bus that interconnects the various cards and allows data and signals to be transferred from one card to another. The line cards 500 connect (interface) the intermediate node 300 with the network 200. The line cards 500 transfer and acquire data packets to and from the network via ports 315 using various protocols such as, ATM and Ethernet. Functionally, the line cards 500 acquire data packets from the network 200 via the ports 315 and forward the data packets to the data bus 320 as well as transmit data packets received from the data bus 320 to the network 200 via the ports 315. The ports 315 may comprise, e.g., ATM, Ethernet, Fast Ethernet (FE), Gigabit Ethernet (GE), and FR ports.

Figure 4:
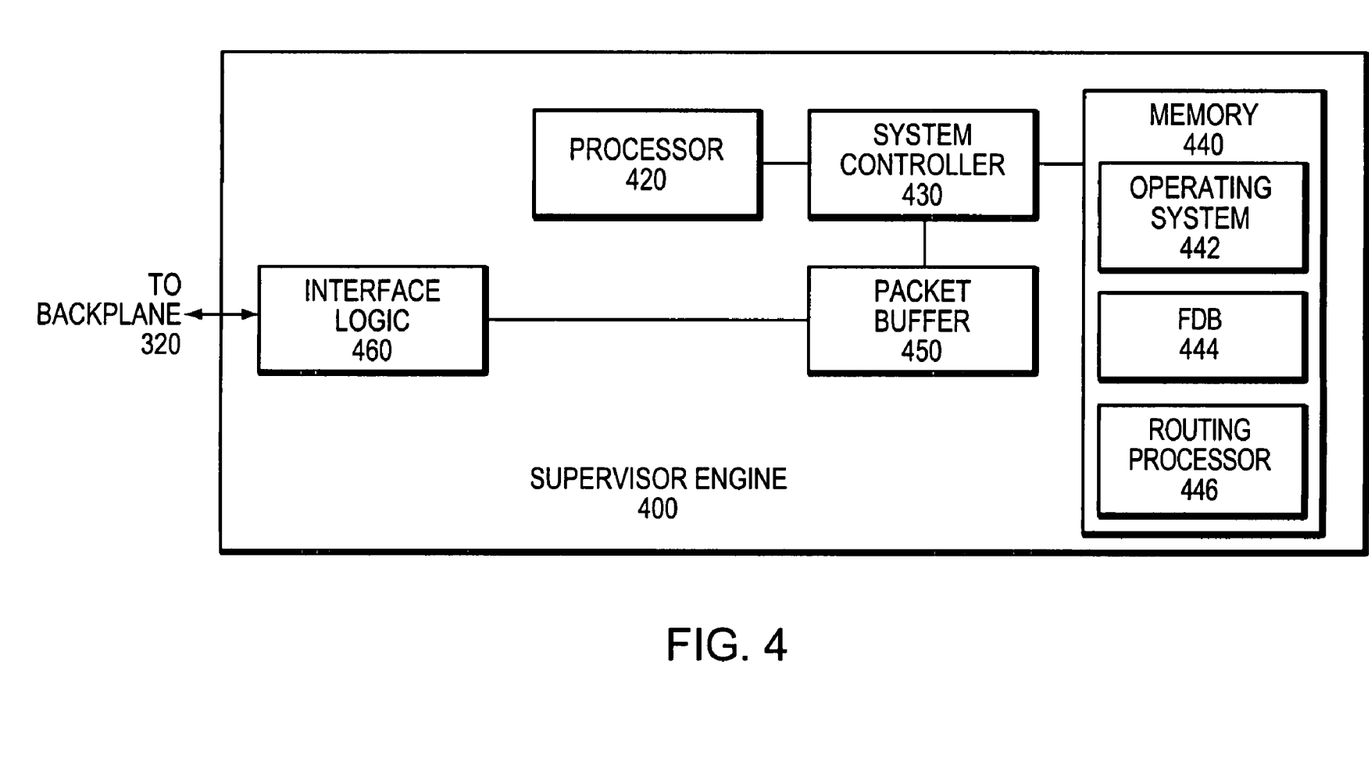
FIG. 4 is a partial schematic block diagram of a supervisor engine that may be used with the present invention.

The supervisor engine 400 comprises logic that is, inter alia, configured to manage node 300, maintain a centralized forwarding database (FDB) that it distributes to the line cards 500, execute various protocols, such as OSPF, IS-IS, and MPLS, and perform other functions including functions that incorporate aspects of the inventive technique. FIG. 4 is a high-level partial schematic block diagram of a supervisor engine that may be advantageously used with the present invention. Supervisor engine 400 comprises a processor 420, system controller 430, interface logic 460 and memory 440. The memory 440 comprises random access memory (RAM) locations addressable by the system controller 430 for storing, e.g., data structures and software programs. Interface logic 460 is coupled to the backplane 320, and is configured to transfer data between the backplane 320 and the processor 420.

The memory 440 is a computer readable medium comprising Dynamic Random Access Memory (DRAM) devices configured to implement a 128 Megabyte (Mb) random-access memory. Memory 440 contains various software and data structures used by processor 420 including forwarding database (FDB) 444, operating system 442 and routing process 446. FDB 444 contains conventional forwarding information, such as L2 and L3 addresses of nodes in the network and interface identifiers (IDs) that identify an interface (e.g., port 315) through which a node associated with an address, contained in the FDB 444, may be reached. Operating system 442 contains computer executable instructions that functionally organize the intermediate node 300 by, e.g., invoking network operations in support of software processes executing on the supervisor engine 400. These processes include routing process 446 which is configured to implement various routing and switching protocols supported by the intermediate node 300 as well as aspects of the present invention. One skilled in the art would know that other computer readable mediums, such as disk storage devices and flash memory devices, may be used to store computer executable instructions that implement aspects of the present invention.

System controller 430 is coupled to the processor 420 and memory 440, and comprises circuitry configured to enable processor 420 to access (e.g., read, write) memory locations contained in memory 440. Processor 420 is a conventional central processing unit (CPU) configured to execute instructions contained in memory 440 for, inter alia, maintaining FDB 444. Specifically, processor 420 executes instructions that acquire information about packets processed by the various line cards 500, such as VLAN IDs, ports and L2 and L3 addresses associated with the packets, and uses this information to maintain FDB 444. Moreover, processor 420 executes instructions to update FDB 444 in accordance with the inventive technique and distribute FDB 444 to the various line cards 500 that may process this information to update and maintain their versions of forwarding databases.

Figure 5:
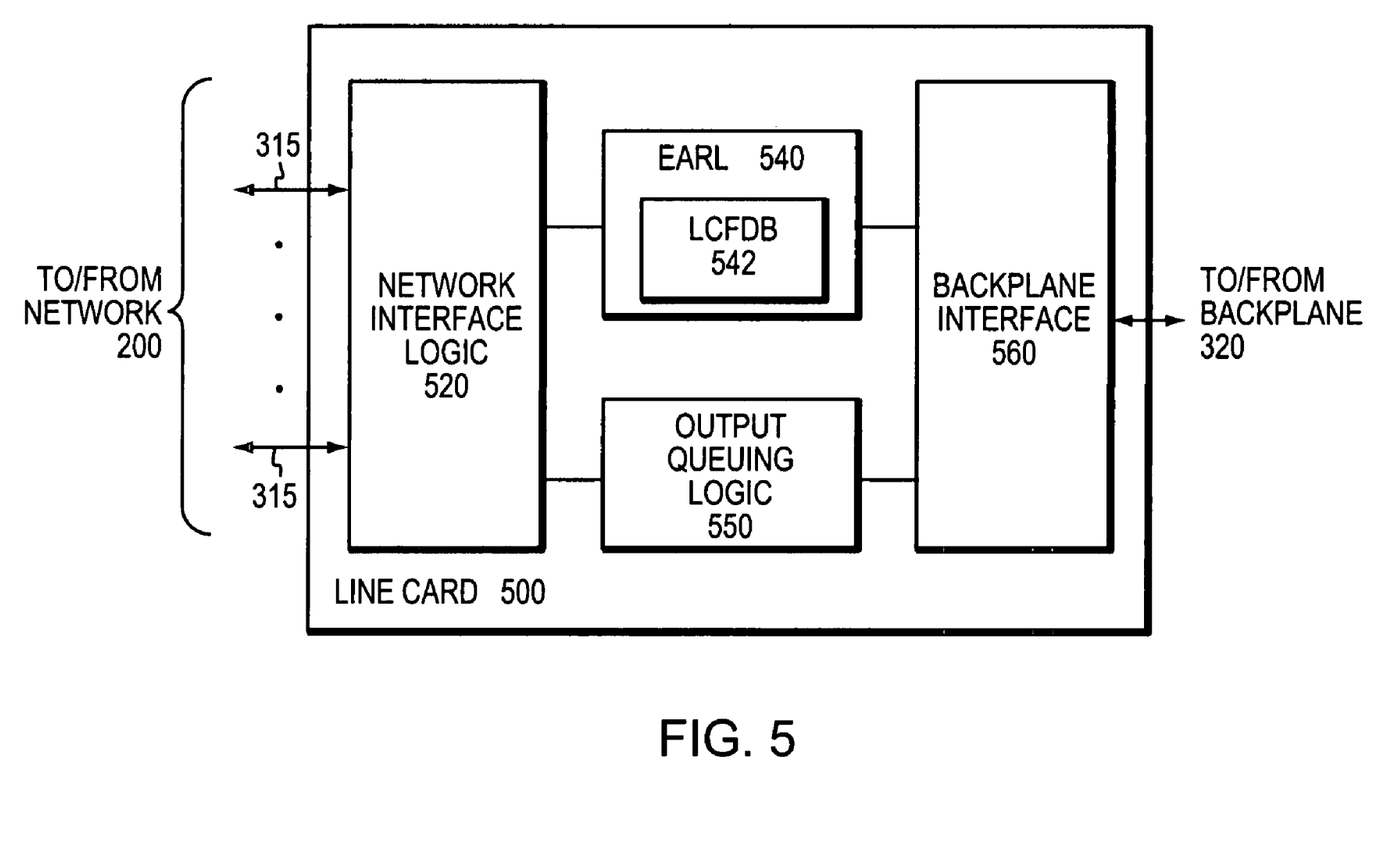
FIG. 5 is a partial schematic block diagram of a line card that may be advantageously used with the present invention.

FIG. 5 is a high-level partial schematic block diagram of an exemplary line card 500 that may be advantageously used with the present invention. Line card 500 comprises network interface logic 520, encoded address recognition logic (EARL) 540, backplane interface logic 560 and output queuing logic 550. Further, line card 500 may contain one or more ports 315 coupled to the network 200.

The network interface logic 520 interfaces the line card 500 to the network 200 and enables the line card 500 to transfer data to and from the network 200 via the ports 315. To that end, logic 520 comprises conventional interface circuitry that may incorporate the signal, electrical and mechanical characteristics, and interchange circuits, needed to interface line card 500 with the network's physical media and protocols running over that media.

The backplane interface logic 560 contains circuitry that interfaces the line card 500 to the backplane 320 and enables the line card 500 to transfer and acquire data to and from other cards coupled to the backplane 320. The output queuing logic 550 contains circuitry, such as output queues and scheduling control logic, configured to control the transfer of data packets onto the network 200 via the ports 315. The EARL 540 is illustratively embodied in an application-specific integrated circuit (ASIC) that comprises circuitry configured to, inter alia, acquire and process data packets including making forwarding decisions for the packets using, e.g., a line-card forwarding database (LCFDB) 542 contained in the EARL 540. The LCFDB 542 contains information, such as destination addresses and associated destination ports, that enables the EARL 540 to determine destinations for packets processed by the EARL 540.

Operationally, data packets are acquired from the network 200 by the network interface 520 via ports 315 and transferred to the EARL 540 where the packets are processed. This processing may include using the LCFDB 542 to determine a destination for each packet, such as another card coupled to the backplane 320 or a port 315 on the line card 500. After the destination for a packet is determined, the EARL 540 directs the backplane interface 560 to transfer the packet to the destination via the backplane 320, if the destination is another card, or to the output queuing logic 550, if the destination is a port 315 on the line card 400. Data packets destined for the supervisor engine 400 are acquired from the backplane 320 by the interface logic 460 and placed in a packet buffer 450 where they are held for further processing by the processor 420.

The present invention incorporates a technique for obviating the effects of micro-loops that may form in a data network as a consequence of intermediate nodes in the network updating their FDBs to accommodate a change in the network's topology. According to the technique, intermediate nodes affected by a network topology change delay updating their FDBs such that nodes nearer the point where the topology change occurred delay updating their FDBs for a longer period of time than nodes farther away from the topology change. By delaying the update of the FDBs in this manner, micro-loops, that may occur otherwise, are avoided.

Illustratively, intermediate nodes 300 execute one or more routing protocols including the IS-IS routing protocol. The inventive technique will be described as it may be illustratively used with the IS-IS protocol and the MPLS FRR protocol; however, it should be noted that other protocols, such as OSPF and IP FRR may take advantage of the inventive technique.

Figure 6:
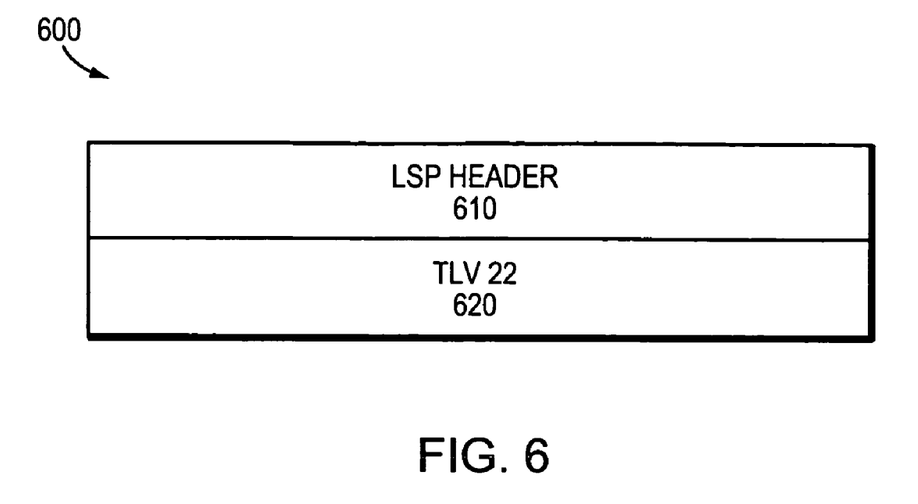
FIG. 6 is a partial schematic block diagram of an Intermediate-System to Intermediate System (IS-IS) Link State Packet (LSP) containing a type-length-value (TLV) type 22 that may be advantageously used with the present invention.

The intermediate nodes 300 exchange IS-IS routing information using advertisement messages called Link State Packets (LSPs). FIG. 6 is a schematic block diagram of a LSP 600 that may be advantageously used with the present invention. LSP 600 contains LSP header information 610 and an optional "type-length-value (TLV) 22" field 620. The LSP header field 610 contains conventional LSP header information, such as an intra-domain routing protocol discriminator, a length indicator, version/protocol identifier (ID) extension, remaining lifetime, LSP ID, sequence number, checksum and so on. The "TLV 22" field 620 illustratively contains an extended IS "reachability" TLV type 22 object which is described in H. Smit et al., "draft-ietf-isis-traffic-05.txt," available from the Internet Engineering Task Force (IETF), and which is hereby incorporated by reference as though fully set forth herein.

It should be noted that advertisement message 600 may contain other routing information that may be used by the intermediate nodes 300 to maintain their FDBs 444, such as IP routing information. A technique that may be used to advertise IP routing information in LSPs is described in R. Callon, "Use of OSI IS-IS for Routing in TCP/IP and Dual Environments," Request For Comments (RFC) 1195, available from the IETF and which is hereby incorporated by reference as though fully set forth herein.

The TLV 22 object 620 may contain, inter alia, one or more sub-TLV objects. For example, the TLV 22 object 620 may contain a link attribute sub-TLV object that describes attributes of protected links in network 200, such as MPLS fast reroute links or IP fast reroute links. A link attribute sub-TLV object that may be used with the present invention is described in J. Vasseur, et al., "Definition of an IS-IS Link Attribute sub-TLV," draft-vasseur-isis-link-attr-00.txt, available from the IETF and which is hereby incorporated by reference as though fully set forth herein.

Figure 7:
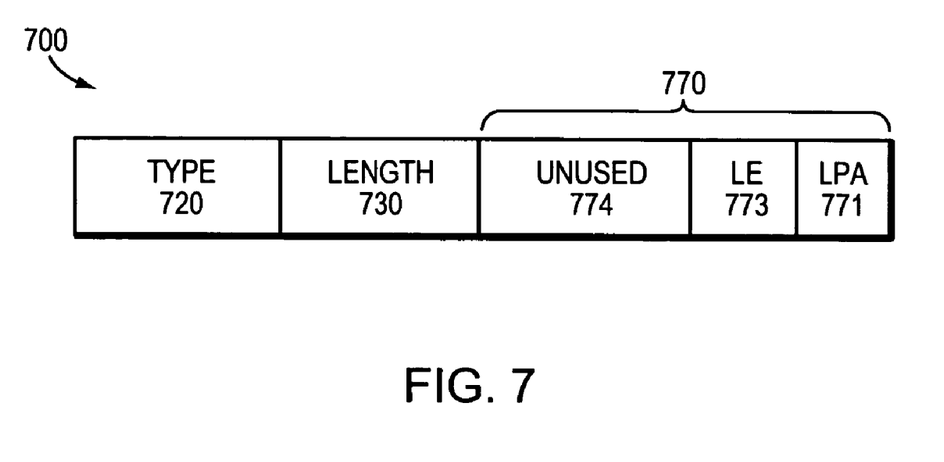
FIG. 7 is a schematic block diagram of a link-attribute sub-TLV that may be advantageously used with the present invention.

FIG. 7 is a schematic block diagram of a link attribute sub-TLV object 700 that may be used with the present invention. Sub-TLV 700 comprises a type field 720, a length field 730 and a flags field 770. The type field 720 holds a value that identifies the sub-TLV as a link-attribute sub-TLV. Preferably this value is 19. The length field 730 contains a value that indicates the length of the sub-TLV 700. Preferably this value is 4 to indicate the sub-TLV is 4 octets in length.

The flags field 770 illustratively holds a bit-wise mask value that represents flags that describe attributes associated with a data link. Illustratively, these flags include a "local protection available" (LPA) flag 771, a "link excluded from local protection path" (LE) flag 773 and an unused flag field 774. The unused flag field 774 illustratively contains a sufficient number of bits that are set to zero and pad the overall length of the flags field 770 to 2 octets. The LPA flag 771 illustratively is a one-bit flag that when set to one indicates that the link represented by the link-attribute sub-TLV 700 is protected by a local protection mechanism, such as a mechanism based on the MPLS FRR protocol or IP FRR protocol. The LE flag 773 is illustratively a one-bit flag that when set to one indicates the link should not be excluded in the calculation of an alternative path (i.e., a path that is an alternative to a failed primary path employing the link).

As noted above, intermediate nodes 300 exchange routing information using advertisement messages (e.g., LSPs). After an intermediate node 300 receives an advertisement message, it examines the message and determines if the network's topology has changed (e.g., a link has failed). If so, the intermediate node 300 responds to the changed topology by generating a new FDB based on the changed topology. In accordance with the inventive technique, to avoid e.g., microloops, the intermediate node further delays updating its FDB 444 with the new FDB and distributing the updated FDB to the line cards 500.

Figure 8:
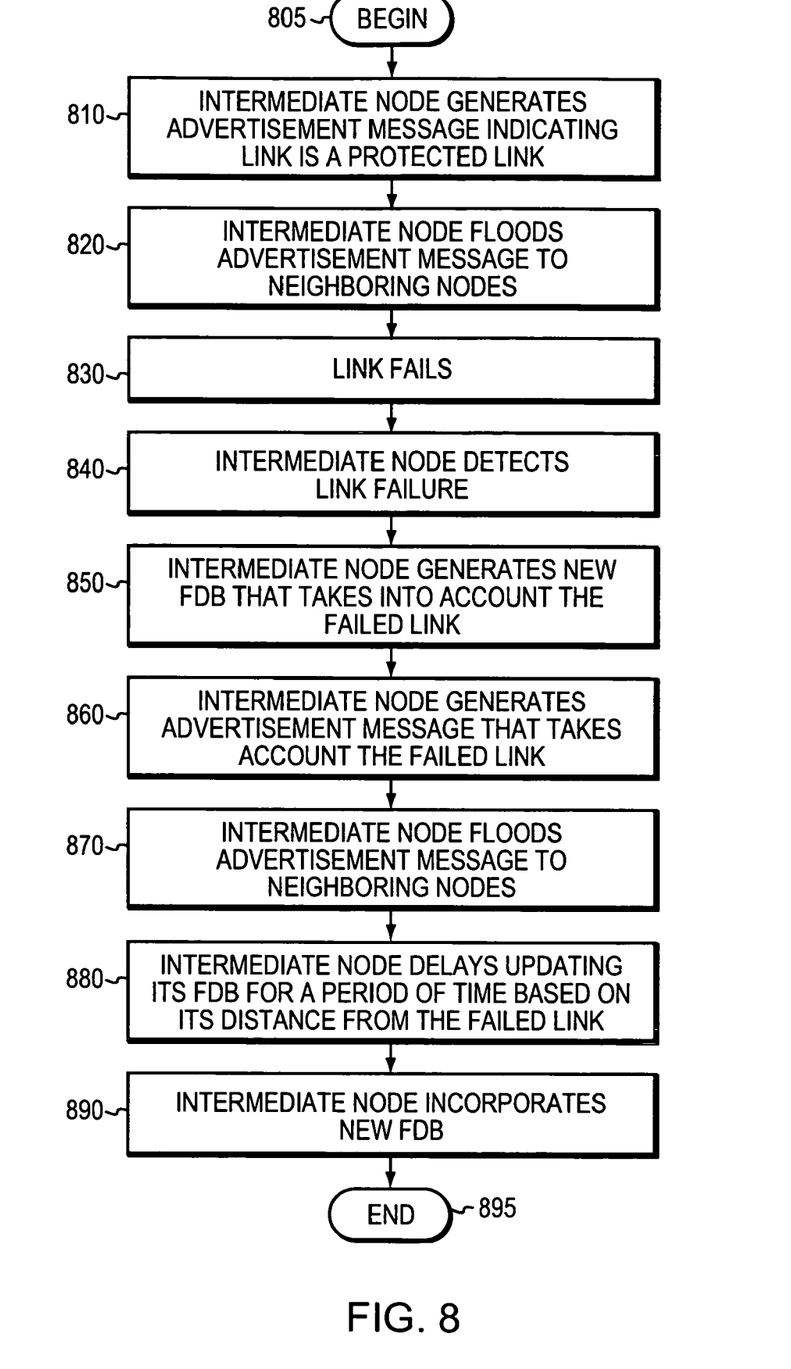
FIG. 8 is a flow diagram of a sequence of steps that may be used to configure an intermediate node to detect and respond to a failed link in a data network in accordance with the inventive technique.

FIG. 8 is a flow chart of a sequence of steps that may be used to configure intermediate node 300 to respond to a topology change in accordance with the inventive technique. Assume that a primary MPLS label-switched path is established between end nodes 208a and 208b (FIG. 2) through intermediate nodes 300a, 300b, 300c, and 300d. Further, assume that link 204d is a protected FRR link and that a backup MPLS label-switched path for link 204d is established from node 300c to node 300d via nodes 300b, 300a, 300e, 300f and 300g.

The sequence begins at Step 805 and proceeds to Step 810 where intermediate node 300c generates an advertisement message indicating link 204d as a protected link. Specifically, at Step 810, intermediate node 300c generates an advertisement message containing a link-attribute sub-TLV 700 for link 204d that indicates the link is "protected" (e.g., LPA 771 is set to one). The intermediate node 300c then floods the advertisement message to its neighboring nodes 300b and 300d (Step 820).

At Step 830, link 204d fails and, at Step 840, intermediate node 300c detects the failed link 204d. At Step 850, in response to the failed link, intermediate node 300c generates a new FDB that takes into account the failed link 204d. Illustratively, the intermediate node 300c takes into account the failed link 204d by determining a new network topology that excludes link 204d and generates a new FDB based on the new network topology. At Steps 860 and 870, intermediate node 300c generates a new advertisement message that takes into account the failed link 204d and floods the new advertisement message to its neighboring nodes (e.g., nodes 300b and 300d), as described above. The new advertisement message may take into account the failed link 204d illustratively by excluding (omitting) the failed link 204d from the message. Alternatively, the new advertisement message may contain information that explicitly indicates that link 204d has failed.

At Step 880, intermediate node 300c delays updating its FDB 444 with information contained in the new FDB for a period of time based on its distance from the point of the failed link 204d. Illustratively, the period of time is determined using the following formula:

$$T=(D-N)*K$$

wherein "T" is the period of time, "D" is the network diameter, "N" is the number of hops between node 300c and the point of the topology change (e.g., link 204d) and "K" is a constant. "K" is a configurable constant whose value depends on various network dynamics, such as the minimum time it takes to inform the intermediate nodes in the network that the link 204d has failed. Preferably, "K" is approximately 500 milliseconds (ms). The maximum network diameter is preferably no greater than 20 hops. As used herein, network diameter refers to the maximum number of hops between the two farthest points in the network. For example, assuming end nodes 208a and 208b are at the farthest points in network 100, the maximum number of hops would be 5 (i.e., a path from end node 208a to end node 208b, via intermediate nodes 300a, 300e, 300f, 300g, and 300d).

After the period of time has elapsed, the sequence proceeds to Step 890 where the intermediate node 300 updates its FDB 444 based on information contained in the new FDB. Illustratively, the intermediate node updates its FDB 444 with information contained in the new FDB and distributes the updated FDB 444 to the line cards 500. The line cards, in turn, update their LCFDBs 542 based on the contents of the distributed updated FDB 444 and begin forwarding data based on their updated LCFDB. At Step 895 the sequence ends.

It should be noted the above-described formula for determining the period of time an intermediate node delays updating its FDB 444 is an example of a formula that may be used with the present invention. Other formulas, both linear and non-linear, may be used with the inventive technique. An example of a non-linear formula that may be used is:

$$T = K1 + K2 * (\log(D-N)^2)$$

wherein "T" is the period of time, "D" is the network diameter, "N" is the number of hops between the intermediate node 300 and the point of the topology change (e.g., the failed link 204d), "K1" and "K2" are constants that depend on various network dynamics, as described above, and "log" is the logarithm base 10 function.

Figure 9:
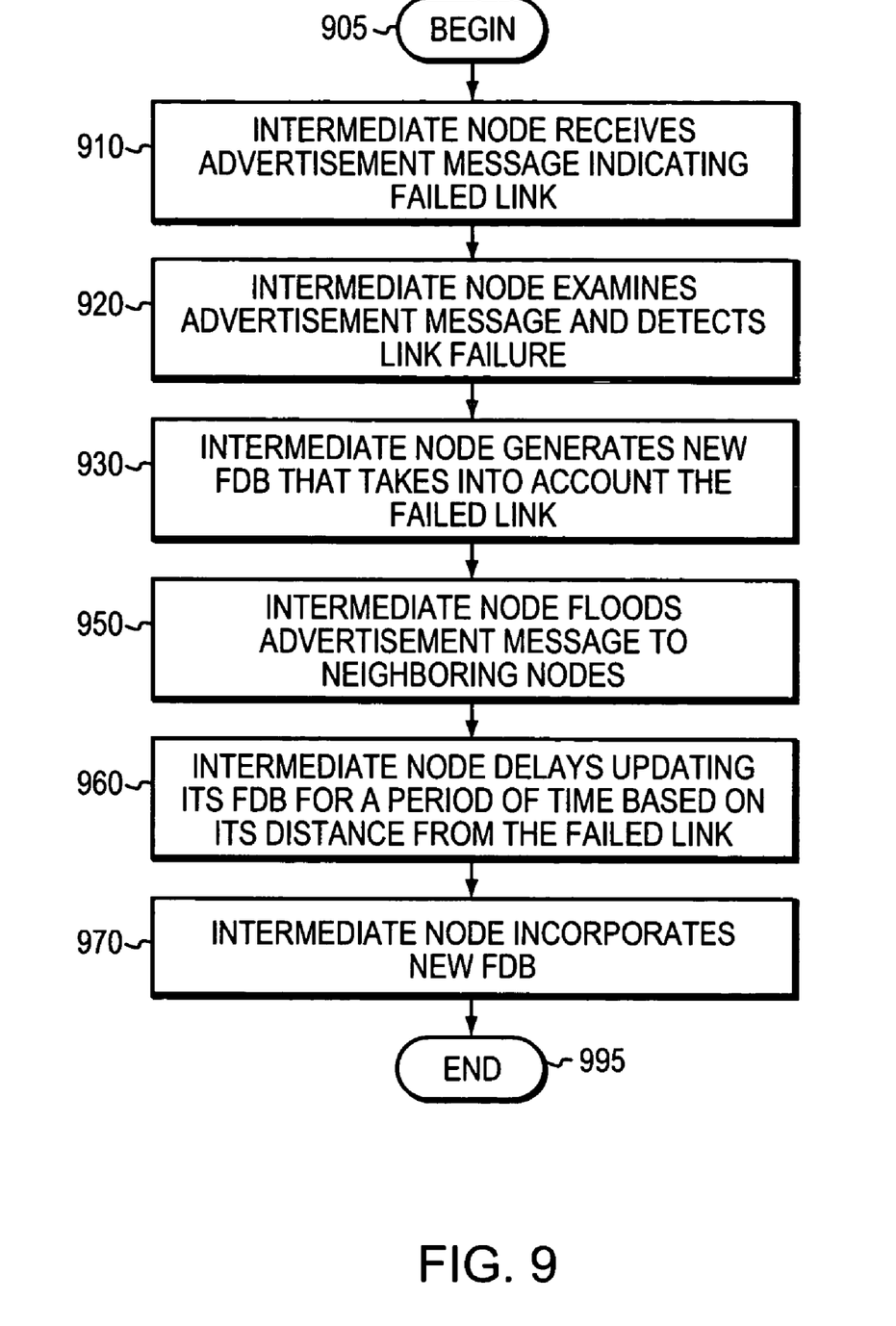
FIG. 9 is a flow diagram of a sequence of steps that may be used to configure an intermediate node to respond to a topology change indicated in an advertisement message, in accordance with the inventive technique.

Certain intermediate nodes 300 in the network 200 may determine that a particular protected link has failed by examining an advertisement message received by the intermediate node. In response to concluding that a protected link has failed the intermediate node generates a new FDB and, in accordance with the inventive technique, delays updating its current FDB with information from the new FDB, as described above. FIG. 9 is a flow chart of a sequence of steps that may be used to configure an intermediate node 300 to process an advertisement message that indicates a failed protected link in accordance with the inventive technique.

Assume data link 204d is a protected link and that link 204d has failed. Further, assume that intermediate node 300c has detected the failed link and has flooded an advertisement message that indicates link 204d has failed, as described above, to its neighboring intermediate nodes (e.g., intermediate node 300b) of the network 200. The sequence begins at Step 905 and proceeds to Step 910 where the intermediate node 300b receives the advertisement message. Next, at Step 920, intermediate node 300b examines the advertisement message and determines that link 204d has failed. This determination may be made by, e.g., comparing the network topology represented in the advertisement message with a network topology represented by a previously received advertisement message and concluding that the state of 204d has changed from being available to no longer being available due to link 204d having failed.

At Step 930, intermediate node 300b generates a new FDB taking into account the failed link 204d, as described above. At Step 950, intermediate node 300b floods the advertisement message it received from intermediate node 300c to its neighboring intermediate nodes (e.g., intermediate node 300a).

Illustratively, the advertisement message is flooded to all neighboring nodes except the node from which it received the advertisement message indicating the link 204d failed (i.e., node 300c). At Step 960, intermediate node 300b delays updating its FDB 444 for a period of time based on its distance from the failed link 204d, as described above. At Step 970, after the period of time has elapsed, intermediate node 300b updates its FDB 444 based on information contained in the new FDB, as described above. The sequence ends at Step 995.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In an intermediate node contained in a data network comprising a plurality of intermediate nodes and a failed protected data link of a label-switched path that is protected by a Fast Reroute (FRR) protocol, a method for avoiding micro-loops in the data network comprising the step of:
   providing a first forwarding database (FDB), configured to hold addresses and interface information, in the intermediate nodes; and
   delaying updating the first FDB for a period of time that is based on the intermediate node's distance from the failed protected data link of the label-switched path that is protected by the FRR protocol, wherein the period of time is longer if the intermediate node is located near the failed protected data link than if the intermediate node is located farther away from the failed protected data link.

2. A method as defined in claim 1 comprising the step of: detecting the failed protected data link.

3. A method as defined in claim 1 comprising the step of: receiving an advertisement message indicating the failed protected data link has failed.

4. A method as defined in claim 1 comprising the steps of:
   generating a second FDB that takes into account the failed protected data link; and
   updating the first FDB based on information contained in the second FDB after the period of time has elapsed.

5. A method as defined in claim 1 wherein the intermediate node is coupled to one or more neighboring intermediate nodes.

6. A method as defined in claim 5 comprising the steps of:
   generating an advertisement message wherein the message indicates the failed protected data link is a protected link; and
   flooding the advertisement message to the one or more neighboring intermediate nodes.

7. A method as defined in claim 6 wherein the advertisement message contains a link attribute sub-type-length-value (TLV) that contains a flag that indicates the failed protected data link is protected by a local protection mechanism.

8. A method as defined in claim 7 wherein the FRR protocol is Multiprotocol Label Switched (MPLS) fast reroute protocol and the local protection mechanism is based on the MPLS fast reroute protocol.

9. A method as defined in claim 7 wherein the FRR protocol is Internet Protocol (IP) fast reroute protocol and the local protection mechanism is based on the IP fast reroute protocol.

10. A method as defined in claim 6 wherein the advertisement message contains a link attribute sub-TLV that contains a flag that indicates the protection for the link is currently active.

11. A method as defined in claim 5 comprising the steps of:
generating an advertisement message that takes into account the failed protected data link; and
flooding the advertisement message to the one or more neighboring intermediate nodes.

12. A method as defined in claim 11 wherein the failed protected data link is taken into account by excluding the failed protected data link from the advertisement message.

13. A method as defined in claim 11 wherein the failed protected data link is taken into account by including information in the advertisement message that explicitly indicates the failed protected data link has failed.

14. A method as defined in claim 1 wherein the period of time is determined using the following formula:

$$T=(D-N)*K$$

wherein "T" is the period of time, "D" is the network diameter, "N" is a number of hops between the intermediate node and the failed protected data link and "K" is a non-zero constant.

15. A method as defined in claim 1 wherein the period of time is determined using the following formula:

$$T=K1+K2*(\log(D-N)^2)$$

wherein "T" is the period of time, "D" is a network diameter, "N" is a number of hops between the intermediate node and the failed protected data link, "K1" and "K2" are constants, at least "K2" being non-zero, and "log" is the logarithm base 10 function.

16. An intermediate node coupled to a network wherein the network contains a failed data link of a label-switched path that is protected by a Fast Reroute (FRR) protocol, the intermediate node comprising:
a memory containing a first forwarding database (FDB), configured to hold addresses and interface information; and
a processor coupled to the memory and configured to delay updating the first FDB based on the intermediate node's distance from the failed data link of the label-switched path that is protected by the FRR protocol, wherein the delay is longer if the intermediate node is located near the failed protected data link than if the intermediate node is located farther away from the failed protected data link.

17. An intermediate node as defined in claim 16 wherein the processor is configured to detect the failed data link.

18. An intermediate node as defined in claim 16 wherein the processor is configured to:
generate a second FDB taking into account the failed data link; and
update the first FDB based on information contained in the second FDB after the period of time has elapsed.

19. An intermediate node as defined in claim 18 wherein the intermediate node is coupled to one or more neighboring intermediate nodes.

20. An intermediate node as defined in claim 19 wherein the processor is configured to:
generate an advertisement message wherein the message indicates the failed data link is a protected link; and
flood the advertisement message to the one or more neighboring intermediate nodes.

21. An intermediate node as defined in claim 19 wherein the processor is configured to:
generate an advertisement message that takes into account the failed data link; and
flood the advertisement message to the one or more neighboring intermediate nodes.

22. An apparatus coupled to a network wherein the network contains a failed protected data link of a label-switched path that is protected by a Fast Reroute (FRR) protocol, the apparatus comprising:
a first forwarding database (FDB), configured to hold addresses and interface information; and
means for delaying updating the first FDB for a period of time that is based on the apparatus's distance from the failed protected data link of the label-switched path that is protected by the FRR protocol, wherein the period of time is longer if the intermediate node is located near the failed protected data link than if the intermediate node is located farther away from the failed protected data link.

23. An apparatus as described in claim 22 comprising:
means for generating a second FDB taking into account the failed protected data link; and
means for updating the first FDB based on information contained in the second FDB after the period of time has elapsed.

24. A computer readable medium storing computer executable instructions for:
detecting a failed protected data link of a label-switched path that is protected by a Fast Reroute (FRR) protocol in a data network; and
delaying updating a forwarding database, configured to hold addresses and interface information, for a period of time based on an intermediate node's distance from the failed protected data link of the label-switched path that is protected by the FRR protocol, wherein the period of time is longer if the intermediate node is located near the failed protected data link than if the intermediate node is located farther away from the failed protected data link.

25. An apparatus comprising:
a memory configured to store a first forwarding database (FDB), configured to hold addresses and interface information; and
a processor coupled to the memory and configured to,
determine a protected data link of a label-switched path that is protected by a Fast Reroute (FRR) protocol has failed,
generate an advertisement message that takes into account the failed protected data link,
flood the advertisement message to the one or more neighboring nodes, and
delay updating the first FDB to take into account the failed protected data link of the label-switched path that is protected by the FRR protocol for a period of time after the advertisement message has been flooded, the period of time longer the nearer the apparatus is located to the failed protected data link and shorter the farther away the apparatus is located from the failed protected data link.

26. The apparatus as defined in claim 25 wherein the processor is configured to determine the protected data link has failed by detecting the protected data link has failed.

27. The apparatus as defined in claim 25 wherein the processor is configured to determine the protected data link has failed by receiving an advertisement message indicating the protected data link has failed.

28. The apparatus as defined in claim 25 wherein the processor is configured to generate a second FDB taking into account the failed data link and update the first FDB based on information contained in the second FDB, after the period of time has expired.

29. The apparatus as defined in claim 25 wherein the advertisement message contains a link attribute sub-type-lengthvalue (TLV) that indicates the failed protected data link is protected by a local protection mechanism.

30. The apparatus as defined in claim 29 wherein the FRR protocol is Multiprotocol Label Switched (MPLS) fist reroute protocol and the local protection mechanism is a provided by MPLS fast reroute protocol.

31. The apparatus as defined in claim 25 wherein the period of time is determined using the following formula:

$$T=(D-N)*K$$

wherein "T" is the period of time, "D" is the network diameter, "N" is a number of hops between the intermediate node and the failed protected data link and "K" is a non-zero constant.

* * * * *

UNITED STATES PATENT AND TRADEMARK OFFICE
CERTIFICATE OF CORRECTION

PATENT NO. : 7,512,064 B2
APPLICATION NO. : 10/868721
DATED : March 31, 2009
INVENTOR(S) : Jean-Philippe Vasseur It is certified that error appears in the above-identified patent and that said Letters Patent is hereby corrected as shown below:

Col. 6, Line 4, please amend as shown:

tions that implement aspects of the present invention. Further, one skilled in the art would know that electromagnetic signals may be generated to carry computer executable instructions that implement aspects of the present invention over e.g., a wireless data link or a data network such as the Internet.

Col. 7, Line 30, please amend as shown:

available from the Internet Engineering Task Force (IETF), http://www.ietf.org Col. 13, Line 4, please amend as shown:

protocol is Multiprotocol Label Switched (MPLS) fist fast reroute

Signed and Sealed this

Twenty-eighth Day of September, 2010

David J. Kappos
*Director of the United States Patent and Trademark Office*